Nov. 22, 1938.   A. J. FISHER   2,137,607
REGULATOR
Filed March 13, 1935   3 Sheets-Sheet 1
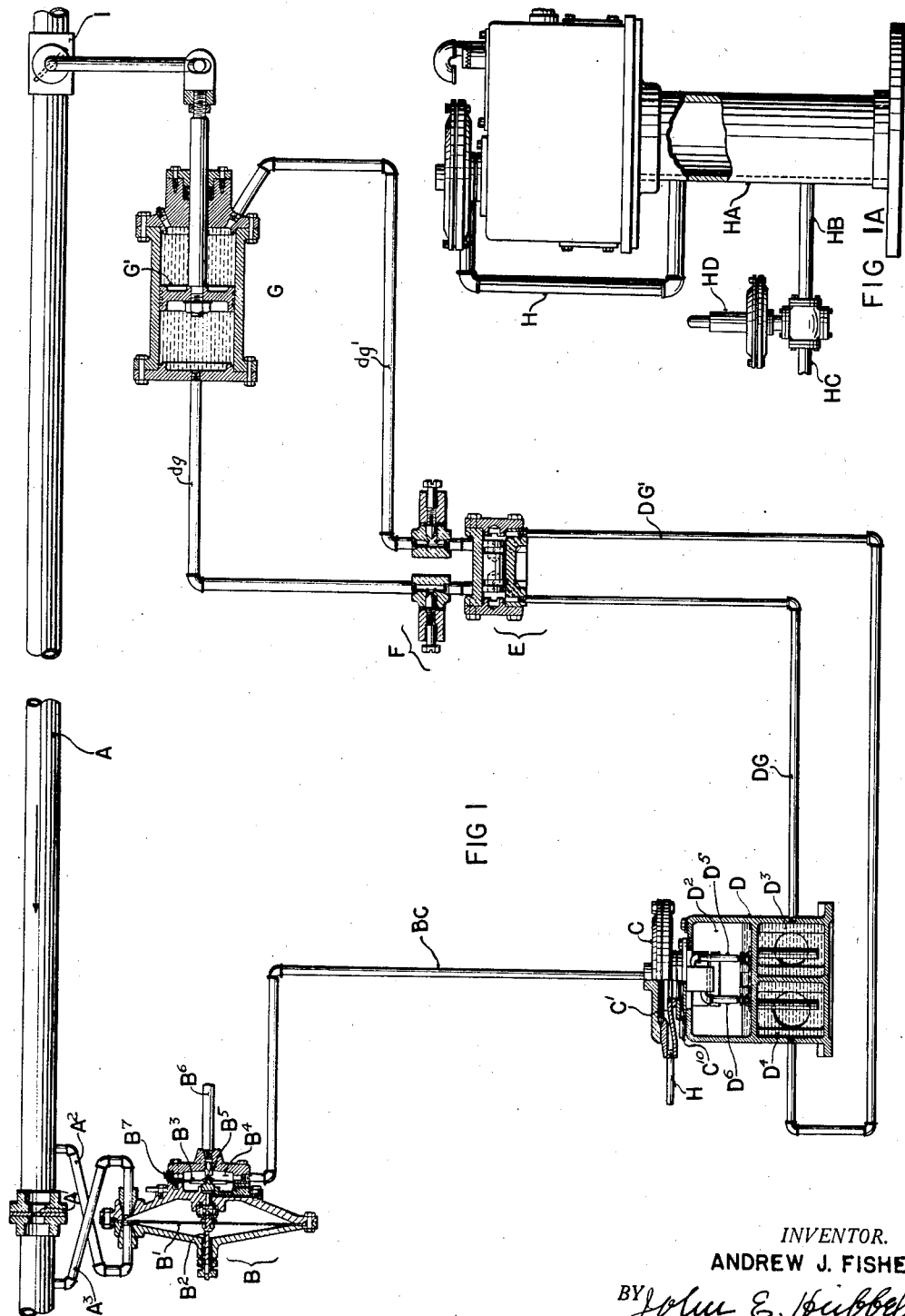
INVENTOR.
ANDREW J. FISHER
BY John E. Hubbell
ATTORNEY Nov. 22, 1938.   A. J. FISHER   2,137,607
REGULATOR
Filed March 13, 1935   3 Sheets-Sheet 2
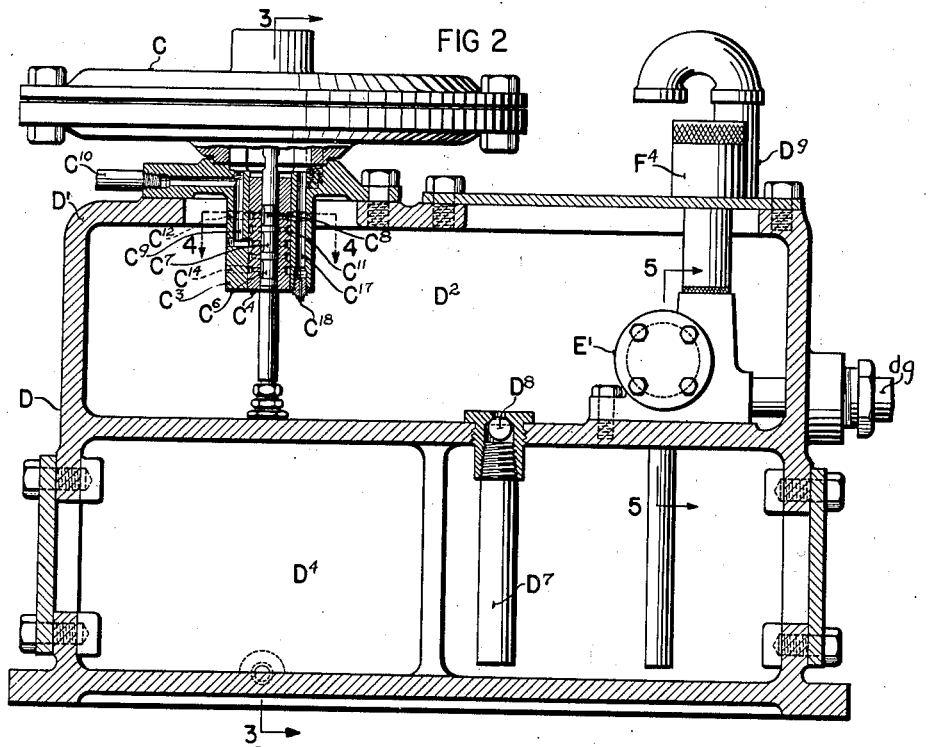
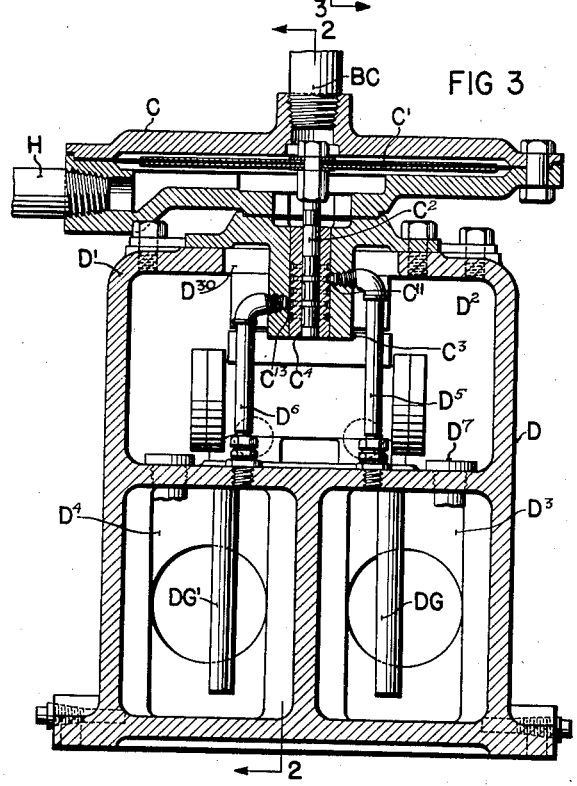
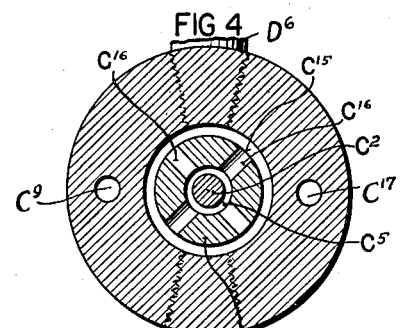
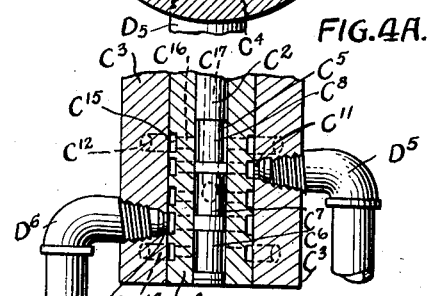
INVENTOR.
ANDREW J. FISHER
BY John E. Hubbell
ATTORNEY Nov. 22, 1938. A. J. FISHER 2,137,607
REGULATOR
Filed March 13, 1935 3 Sheets-Sheet 3
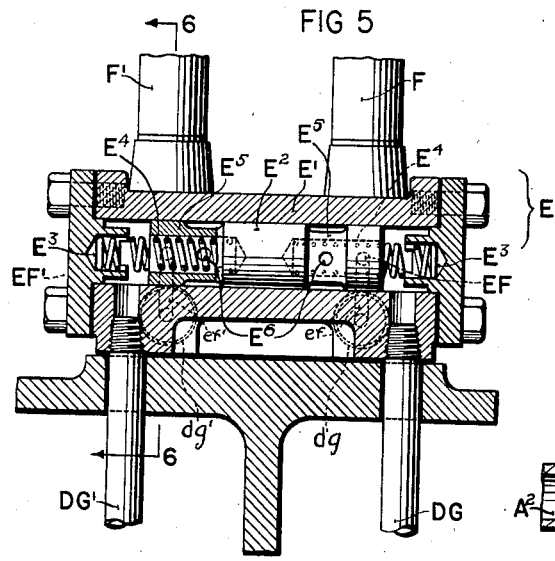
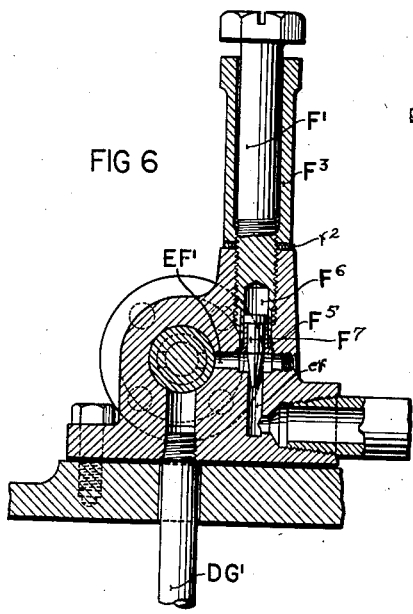
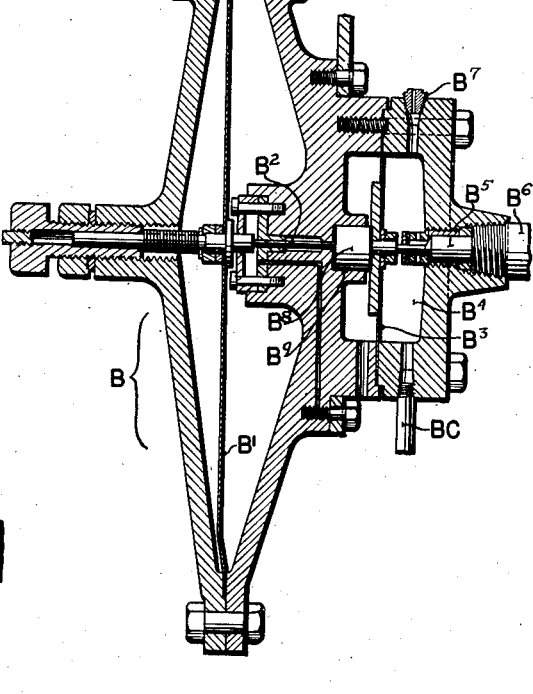
INVENTOR.
ANDREW J. FISHER
BY John E. Hubbell
ATTORNEY Patented Nov. 22, 1938

2,137,607

UNITED STATES PATENT OFFICE 2,137,607

REGULATOR

Andrew J. Fisher, Sparrows Point, Md., assignor to The Brown Instrument Company, Philadelphia, Pa., a corporation of Pennsylvania Application March 13, 1935, Serial No. 10,778

3 Claims. (Cl. 60—51)

The general object of the present invention is to provide an improved regulator of the type including a servo-motor and means for controlling its operation of the latter. More specifically, the object of the invention is to provide a regulator of the type specified in which the servo-motor is a reciprocating hydraulic motor, and in which the liquid actuating the motor is subjected to the pressure variations required for the actuation of the motor by variations in the pressure of an elastic fluid admitted to, and exhausted from pressure chambers of the regulator by the actuation of a control valve forming a part of the regulator control means. In ordinary practice, the regulator liquid is oil, and the elastic fluid is air supplied under pressure to the regulator, which is thus an air-hydraulic regulator.

While the control valve of the regulator may be operated manually or automatically in various ways, in the preferred form of the invention, the valve is a fluid pressure motor valve, and is actuated by a variable fluid pressure or, and more usually, by the differential of two fluid pressures, one of which is a master control pressure, and the other of which is a pressure which is a function of the value of the quantity or condition directly or indirectly controlled by the regulator. The master control pressure itself may be controlled either manually, or automatically by means which may be wholly independent, both structurally and operably, from the regulator proper.

The regulator is adapted for use under widely varying conditions and for very different purposes. It is especially well adapted, however, for use in controlling dampers and valves and analogous control elements of combustion control and fluid distribution control systems, and is especially well fitted for such uses by its structural and operative simplicity and reliability, and also because it may readily be designed to provide all the servo-motor power and range of movement required, with a moderate consumption of compressed air supplied to the regulator at a moderate pressure.

Specific objects of the present invention are to provide simple and effective means for regulating the rate of operation of the servo-motor, and for eliminating any tendency of the motor to drift, or move under conditions in which it should remain motionless, and for automatically returning oil to chambers forming a part of the pressure system of the regulator and from which oil is expelled under certain conditions of operation into a reservoir space forming no part of that system. Further specific objects of the invention are to provide various novel features of construction and arrangement employed with advantage in a simple and desirable embodiment of the present invention.

The various features of novelty which characterize the present invention are pointed out with particularity in claims annexed to and forming a part of this specification. For a better understanding of the invention, however, its advantages and objects attained with its use, reference should be had to the accompanying drawings and descriptive matter in which I have illustrated and described a preferred form of embodiment of the invention.

Of the drawings:

Fig. 1 is a somewhat diagrammatic, or schematic, representation of a control system in which the improved regulator is employed to maintain a constant relation between the fluid flow through a conduit and a master control pressure impressed on the regulator.

Fig. 1A is an elevation, partly in section, illustrating special provisions, not shown in Fig. 1, for impressing the master control fluid pressure on the regulator.

Fig. 2 is a vertical section, taken on the line 2—2 of Fig. 3, of a regulator unit including regulator elements shown as mechanically disassociated in Fig. 1.

Fig. 3 is a vertical section on the line 3—3 of Fig. 2.

Fig. 4 is a horizontal section on the line 4—4 of Fig. 2.

Fig. 4A is a sectional elevation of a portion of the control valve mechanism taken similarly to Fig. 3 but on a larger scale.

Fig. 5 is a partial section on the line 5—5 of Fig. 2.

Fig. 6 is a section on the line 6—6 of Fig. 5.

Fig. 7 is an enlarged section of an element of the control system shown in Fig. 1, employed to impress on the regulator proper, a regulating force which is a measure of the controlled rate of flow.

In the apparatus illustrated diagrammatically in Fig. 1, the flow of fluid through a conduit A is made dependent upon the value of a fluid pressure control force, which is not fixed or determined by the apparatus shown in Fig. 1, and may be constant or variable, dependent upon the conditions of use. For example, if the conduit A supplies fluid fuel or combustion air to a furnace, the control pressure force may be automatically dependent upon a pressure, temperature, or other condition or quantity indicative of the furnace combustion requirement.

The apparatus shown diagrammatically in Fig. 1 comprises a device B which may be called a static converter, and serves to establish a fluid pressure regulating force which is a function of the rate of flow through the conduit A. The apparatus shown in Fig. 1 includes a regulating mechanism including elements C, D, E. F, and G, through which on a variation in one direction or the other of said regulating force, relative to a control force transmitted to the regulating mechanism by the conduit H, the element G, which is a fluid pressure servo-motor, is actuated in one direction or the other to thereby effect a compensating adjustment of a flow throttling valve I in the conduit A. This regulating mechanism comprising the elements C, D, E, F, and G, may aptly be termed an air-hydraulic regulator as the elements D, E, and F constitute means for subjecting the motor element G to hydraulic actuating forces created and regulated by pneumatic pressure force controlled by the element C. In the preferred embodiment of the regulating mechanism, illustrated in Figs. 2 to 6, the elements C, D, E, and F are mechanically united in a single compact structural unit, in which the casing of the element D forms a mechanical support for the elements C, E, and F.

The device B, as shown in Fig. 1, and on a larger scale in Fig. 7, comprises a flexible diaphragm $B'$ dividing a pressure chamber into two compartments respectively subjected to pressures which differ from one another by an amount which is a function of the fluid rate of flow through the conduit A. To this end, as shown, the conduit A is provided with a restricted measuring orifice $A'$, and conduits $A^2$ and $A^3$ transmit the static pressures in the conduit A, at the up and downflow sides, respectively, of the orifice $A'$, to the pressure chamber compartments at the left and right, respectively of the diaphragm B. An actuating member $B^2$ connected to the central portion of, and extending transversely to the diaphragm $B'$, connects the latter to the central portion of a flexible diaphragm $B^3$. The latter forms the movable wall of a pressure chamber $B^4$. The side of the diaphragm $B^3$ remote from the chamber $B^4$ is exposed to atmospheric pressure. The longitudinal movements of the member $B^2$, control the supply of a pressure fluid to the chamber $B^4$. That pressure fluid supply may advantageously be compressed air supplied from a suitable source, not shown, through a supply pipe $B^6$, at a rate dependent on the position of the valve end $B^5$ of the member $B^2$. $B^7$ represents a bleeder outlet from the chamber $B^4$ through which pressure fluid escapes from the chamber $B^4$ to reduce the pressure in the chamber $B^4$ to a suitable rate when the valve $B^5$ is in its closed position but not rapidly enough to prevent the pressure in the chamber $B^4$ from increasing at a suitable rate when the valve $B^5$ is in its open position.

The effect of the pressure at the upflow side of the orifice A, acting on the left hand side of the diaphragm $B'$, is normally balanced by the sum of two effects, one of which is the action of the pressure at the downflow side of the orifice $A'$ on the right hand side of the diaphragm $B'$, and the other of which is the action of the pressure in the chamber $B^4$ on the diaphragm $B^3$. In the normal balanced condition of the device B, the valve $B^5$ is cracked sufficiently to make the rate of flow of pressure fluid into the chamber $B^4$ through the supply pipe $B^6$ equal to the rate of escape of pressure fluid from the chamber $B^4$ through the bleeder outlet $B^7$.

When the rate of flow through the conduit A increases, and the pressure transmitted to the device B through the pipe $A^2$ increases relative to that transmitted by the pipe $A^3$, the valve $B^5$, is given an opening adjustment, and results in an increase in the pressure in the chamber $B^4$ which restores the balance. Conversely on a decrease in the rate of flow through the conduit A, and the resulting decrease in the pressure transmitted by the pipe $A^2$ relative to that transmitted by the pipe $A^3$, the valve $B^5$ is given a closing adjustment, and the pressure in the chamber $B^4$ is diminished to restore the balance. The pressure in the chamber $B^4$ thus is normally in constant proportion to the differential of the pressures at the opposite sides of the orifice $A'$, and therefore is proportional to the square of the velocity of flow through the conduit A. To minimize objectionable fluctuations of the pressure in the chamber $B^4$, the movement of the valve $B^5$ may be retarded by a dashpot action, for which purpose the stem $B^2$ is shown as carrying a piston enlargement $B^8$ working in a dashpot chamber $B^9$ formed in the casing of the device B.

The pressure in the chamber $B^4$ constitutes a regulating force transmitted by the pipe BC to one of the two compartments into which a pressure chamber of the regulator control element C is divided by a horizontally disposed flexible diaphragm $C'$. The pressure in the other compartment of that chamber is the master control force pressure transmitted to the regulating mechanism by the pipe H. The element C is a fluid pressure actuated control valve, automatically responsive to variations in the differential of the pressures acting on the opposite side of its diaphragm $C'$.

In the preferred construction shown in Figs. 2 and 3, the element C is mounted on the top wall $D'$ of the casing of the element D, and includes a valve portion extending into a chamber $D^2$ within said casing through an opening $D^{30}$ in said top wall. Said valve portion comprises a vertical valve plunger or piston valve $C^2$, and a valve casing or housing in which the valve plunger $C^2$ is vertically movable to establish and interrupt communication between various pairs of ports formed in the valve housing. The plunger $C^2$ is connected to and moved by the diaphragm $C'$. To facilitate its manufacture, the valve housing is formed by an outer tubular shell $C^3$, and a separately formed sleeve member $C^4$ fixed in the shell $C^3$, and the bore of which forms a central valve chamber $C^5$ for the valve plunger $C^2$. The latter is in the form of a cylinder cut away to provide three longitudinally displaced circumferential grooves $C^6$, $C^7$, and $C^8$, each of which, in certain positions of the valve member, establishes communication between corresponding pairs of ports formed in the shell $C^3$ and communicating with the passage $C^5$ through corresponding ports or passages formed in the sleeve $C^4$.

The element C regulates the flow of fluid into and out of, and the fluid pressure within, pressure chambers $D^3$ and $D^4$ of the element D, the chamber $D^3$ being connected by conduit means, shown diagrammatically in Fig. 1 as including pipes DG and $dg$, to the lefthand end of the cylinder of the pressure motor G, while the righthand end of that cylinder is connected by conduit means shown in Fig. 1 as including pipes DG' and dg', to the chamber $D^4$. In the arrangement shown, the cylinder of the motor G and the conduits connecting it to the chambers $D^3$ and $D^4$ contain liquid, ordinarily oil, which also fills both of said chambers under static or balanced conditions, under certain operating conditions, however, one or the other of the chambers $D^3$ and $D^4$ is filled partly by liquid and partly by compressed air.

The tubular valve housing member $C^3$ of the controller C is formed with a compressed air supply passage or port $C^9$ connected at its outer end to a source of compressed air (not shown) by a pipe $C^{10}$. At its lower and inner end, the passage $C^9$ communicates through a passage space in the sleeve $C^4$ with the valve chamber $C^5$ at a level midway between the top and bottom of the valve groove $C^8$ when the plunger $C^2$ occupies its neutral position shown in Figs. 2 and 3. At this point it may be explained, that the lower end of the passage $C^9$, as well as each of the hereinafter mentioned ports $C^{11}$, $C^{12}$, $C^{13}$, and $C^{14}$ in the tubular housing member $C^3$, communicates at its inner end with the valve chamber $C^5$ through a corresponding circumferential groove or passage $C^{15}$ and a plurality of radial ports $C^{16}$ formed in the sleeve member $C^4$, and all at the same level. The described passage and port arrangement insures a relatively large port area directly controlled by the portions of the plunger valve $C^2$ at the ends of its corresponding grooves $C^6$, $C^7$, and $C^8$.

In the particular valve arrangement shown, the chamber $D^3$ is connected by a pipe $D^5$ to a port $C^{11}$ in the valve housing communicating with the valve chamber $C^5$ at a level above that of the port $C^9$, so that a movement of the valve member $C^2$ upward from its position shown in Figs. 2 and 3 will permit the passage of compressed air from the port $C^9$ through valve member passage $C^7$, port $C^{11}$ and pipe $D^5$ into the chamber $D^3$. On a downward movement of the valve member $C^2$ from the position shown in Figs. 2 and 3, valve passage $C^6$ puts port $C^{11}$ in communication with an exhaust port $C^{12}$ in the valve housing above the port $C^{11}$ and opening at its outer end into the chamber $D^2$. The pressure in the latter is atmospheric, as the chamber D is in communication with the atmosphere through the port $D^9$.

As shown, also, the chamber $D^4$ is connected by a pipe $D^6$ to a port $C^{13}$ in the valve housing. Port $C^{13}$ opens to the chamber $C^5$ at a level below that at which the port $C^9$ opens, and on a down movement of the valve member $C^2$ from the position shown in Figs. 2 and 3, compressed air passes from the port $C^9$ through the valve passage $C^7$, port $C^{13}$, and pipe $D^6$ into the chamber $D^4$. On an up movement of the valve member $C^2$ from its position shown in Figs. 2 and 3, the port $C^{13}$ is connected through the valve passage $C^8$ to a lower exhaust port $C^{14}$ which opens at its outer end to the chamber $D^2$.

With the described valve arrangement, an increase in the pressure of the static converter chamber $B^4$ relative to the master controller pressure in the pipe H resulting from an unduly high rate of flow through the conduit A, produces a down movement of the valve member $C^2$. This down movement of the valve member $C^2$, as previously explained, results in the passage of compressed air into the chamber $D^4$ through the flow passage including ports $C^9$ and $C^{13}$ and valve passage $C^7$, and also permits the discharge of fluid from the chamber $D^3$ through the ports $C^{11}$ and $C^{12}$ and valve passage $C^8$. The resultant increase in pressure in the chamber $D^4$ produces a movement of the servo-motor piston $G'$ to the left, and thereby gives a closing adjustment to the valve I. Conversely when the flow through the conduit A and the pressure in the static converter chamber $B^4$ diminish relative to the master control pressure in the pipe H, the valve member $C^2$ is given an up movement which connects the chamber $D^3$ to the compressed air supply port $C^9$ through port $C^{11}$ and valve passage $C^7$ and connects the chamber $D^4$ to its exhaust port $C^{14}$ through port $C^{13}$ and valve passage $C^8$. When the pressure in the chamber $D^3$ is thus increased, the servo-motor piston $G'$ is moved to the right and the valve I is given an opening adjustment to thereby increase the flow through the conduit A.

With the servo-motor controlled in the manner described, the adjustment of the valve I in either direction is continued until the valve reaches the limit of its corresponding adjustment, unless before it reaches said limit the change in the flow through the conduit A is increased or decreased to restore the balance and return the control valve member $C^2$ to its neutral position, and thereby interrupt the operation of the servo-motor.

When compressed air is admitted to either of the chambers $D^3$ and $D^4$, the resultant actuation of the servo-motor displaces oil from the chamber into the servo-motor. When thereafter the supply of compressed air to the chamber is interrupted, and the air pressure in the chamber again becomes equal to that of the atmosphere, as a result of opening the chamber to exhaust or of valve leakage, the chamber refills with oil in consequence of a gravity flow of oil into the chamber from the chamber $D^2$ through a corresponding oil return passage $D^7$ provided for the purpose. The passages $D^7$, one for each of the chambers $D^3$ and $D^4$, are in the form of pipes leading down into said chambers and threaded into openings in the bottom wall of the chamber $D^2$. Each return passage includes a non-return check valve $D^8$ preferably of the ball type and located at the top of the passage. Each such non-return valve serves to prevent outflow of oil into the chamber $D^2$ from the corresponding chamber $D^3$ or $D^4$, when the pressure in that chamber is increased by the admission of compressed air thereto. When oil is being moved to the servo-motor from either of the two chambers $D^3$ and $D^4$, the other discharges oil into the chamber $D^2$ through the corresponding pipe $D^5$ or $D^6$ and corresponding exhaust port $C^{12}$ or $C^{14}$.

The movement of the valve member $C^2$ away from a previous position in which it connected the supply passage $C^9$ to one or the other of the chambers $D^3$ and $D^4$ should terminate the movement of the piston $G'$. Drift of the piston $G'$ or movement of the latter as a result of pressure variations in the chambers $D^3$ and $D^4$, other than those produced by the adjustment of the valve members $C^2$ to connect one chamber or the other to the air supply passage $C^9$, is prevented by the regulator element E. The latter tends at all times to assume a condition in which it prevents flow of oil into or out of either end of the cylinder of the fluid pressure motor G. As diagrammatically shown in Fig. 1, the locking element E is mechanically connected to the element D only through the conduit or pipe sections DG and DG'. In the unit construction shown in Figs. 2–6 inclusive, however, the element E is located within the chamber $D^2$, and is mounted on the bottom wall of that chamber.

The locking element E is, in effect, a fluid pressure valve comprising a valve chamber $E'$ and a piston valve member or plunger $E^2$ mounted therein. The plunger $E^2$ is normally held in the intermediate position shown in Fig. 5 by springs $E^3$ acting on the opposite ends of the plunger $E^2$ which has its ends formed with recesses $E^4$ into which the springs $E^3$ extend. Each spring $E^3$ is stiff enough to prevent it from being compressed by the plunger, except when the opposite end of the plunger is subjected to a fluid pressure but little less than the normal compressed air pressure in the control valve supply passage $C^9$. In the regulator unit of Figs. 2-6, pipes DG and DG' are short vertical pipes which connect the opposite ends of the chamber $E'$ to the chambers $D^3$ and $D^4$, respectively below the minimum oil levels therein.

Radial ports EF and EF' open to the chamber $E'$ adjacent the ends of the latter at which the conduits DG and DG' respectively open to the chamber. In the neutral position of the piston or plunger $E^2$, shown in Fig. 5, the ends of that plunger extend across and close the ports EF and EF'. When one of the chamber $D^3$ and $D^4$, for example, the chamber $D^3$, is connected to the compressed air supply passage $C^9$, the pressure then transmitted through the pipe DG to the lefthand end of the chamber $E'$, as seen in Fig. 5, moves the plunger $E^2$ to the right to uncover the port EF. This permits the passage of oil from the pipe DG through the corresponding end of the cylinder $E'$, port EF, and pipe $dg$ to the corresponding end of the cylinder of the motor G. The piston $E^2$ is formed with a piston groove $E^5$ adjacent each end and with radial ports $E^6$ leading from each groove $E^5$ to the corresponding recess $E^4$. When the piston valve $E^2$ is moved to the left as seen in Fig. 5, thereby uncovering the inner end of the port EF', and placing the latter in communication with the pipe DG', the port EF is placed in communication with the pipe DG through the lefthand piston groove $E^5$ and the corresponding ports $E^6$ and recess $E^4$. Displacement of the valve member $E^2$ similarly connects the pipes DG and DG' to the ports EF and EF', respectively.

Each of the pipes $dg$ and $dg'$ is shown in Fig. 1 as including a corresponding throttling device F, which is mechanically separate from the elements D and E. In the regulator unit construction shown in Figs. 2-6, however, the pipes $dg$ and $dg'$ are mechanically connected to the casing of the element E and communicate with the ports EF and EF', therein, through respective casing passages or ports $ef$ and $ef'$. The regulating element F associated with the pipe $dg$, is a tapered plunger or needle valve axially adjusted to extend a variable distance into and correspondingly throttle the passage $ef$ connecting the port EF to the pipe $dg$. The regulating device F associated with the pipe $dg'$ similarly throttles the passage $ef'$ connecting the port EF' to the pipe $dg'$. Each of the devices F is secured in the end of a regulating screw F'' threaded into a threaded opening in the casing of the member E coaxial with the corresponding passage $ef$ or $ef'$. Leakage out of the casing along either screw F'' is prevented by gasket $f^2$ surrounding the screw and compressed between a seat portion formed on the casing and a sleeve member $F^3$ surrounding and threaded on the portion of the screw F'' extending away from the casing of the member E. Each screw F and corresponding sleeve member $F^3$ extends through the top wall $D^1$ of the chamber $D^2$, and advantageously is covered by a removable hood or cap member $F^4$.

Screw F'' is provided with a portion $F^5$ forced into the space $F^6$ at its lower end. The portion $F^5$ provides a ledge on which throttling member $F^7$ rests, the said ledge forming a lower limit stop for member $F^7$. Member $F^7$ is permitted to rise off the said ledge upon a reverse flow as for example, a flow from passage $ef$ into passage EF' in Fig. 6. The provision for movement of member $F^7$ is practically important in that it permits flushing of its valve seat to remove any particles collected thereon. Furthermore, with this construction only one member F at a time is operative, during the actuation of piston $G^1$, to throttle the flow to the piston cylinder G thereby facilitating variation of the speed of piston $G^1$ in one direction in response to a given pressure change in a chamber $D^3$ or $D^4$ from the speed of piston $G^1$ in the other direction in response to an equal and opposite pressure in the other of said chambers. The latter is practically important because of the variation in frictional or like characteristics of the moving parts of the system necessitating individual adjustment of the rate of flow to either side of piston $G^1$.

The axial adjustments of the regulating members F determine the rate of oil flow between the chambers $D^3$ and $D^4$ and the ends of the cylinder of the fluid pressure motor G, and thereby determine the rapidity or sensitiveness of the control system by which the adjustment of the damper I is varied in response to a variation in the relation between the master control pressure transmitted by pipe H, and the rate of flow to the conduit A.

In the preferred construction illustrated, a vertical passage $C^{17}$ formed in the shell portion $C^3$ of the valve housing opens at its upper end into the pressure chamber beneath the diaphragm $C^1$ to which the master control pressure is transmitted by the pipe H. At its lower end, passage $C^{17}$ is provided with a restricted outlet $C^{18}$ shown as formed by an axial passage through a plug screwed into threaded lower end of the passage $C^{17}$. The restricted passage $C^{18}$ serves for the escape of entrained moisture carried into the pressure chamber beneath the diaphragm $C^1$, or formed in that chamber by condensation. The orifice $C^{18}$ may also serve as a bleeder outlet when the means supplying the master control force pressure transmitted to the regulator by the pipe H requires such an outlet, as in the arrangement illustrated in Fig. 1A, which is desirably employed in some cases.

In Fig. 1A, the pipe H receives air under pressure from a reservoir space or surge chamber HA conveniently formed as shown by the space within a hollow pedestal on which the regulator unit is mounted. The surge chamber HA receives air under suitable pressure through a pipe HB leading from the outlet of a master controller HD having an inlet connected by a pipe HC to a source of air under pressure higher than the normal pressure in the chamber HA and pipe H. The master controller HD may be nothing but a pressure reducing valve, in effect, subjected to manual adjustment when the pressure transmitted by the pipe H is normally constant but is subject to manual adjustment. The master controller HD may also be a device like or analogous to the static convertor B, for varying the pressure transmitted by the pipe H in automatic correspondence with variation in some control quantity or condition, such, for example, as a blast pressure, a furnace temperature, a steam pressure, or a rate of flow, in apparatus with which the conduit A of Fig. 1 is associated. The construction form of a regulator HD suitable for the purposes just mentioned, need not be illustrated and described herein, as it forms no part of the present invention, and as master controllers for the general purposes and of the general types mentioned, are well known. Regardless of the form of the master controller, the simple and effective provisions illustrated in Fig. 1A for providing a surge chamber between the master controller HD and the control element C, is desirable, as such a surge chamber tends to eliminate minor but objectionable fluctuations at the master controller outlet which the latter is not intended to create, but which in practice may be incident to its operation.

As will be apparent to those skilled in the art, the air-hydraulic regulator disclosed herein gives advantages characteristic of control systems which are wholly pneumatic and of control systems which are wholly hydraulic, while avoiding certain objections inherent in each of those systems. In particular, the use of the air-hydraulic regulator gives the positive and reliable servo-motor operation which is characteristic of hydraulic control systems, without requiring the use of the relatively expensive oil pumping mechanism commonly included in hydraulic control systems. Such oil pumping mechanism is in general more expensive than the air compressing mechanism required to supply compressed air to the air-hydraulic regulator. Moreover, in many installations in which the air-hydraulic regulator may be used with advantage a supply of compressed air, required for other purposes, will be available for use in controlling the air hydraulic regulator, and the use of the latter will not require separate air compressing means.

In general, the maintenance expense of the air-hydraulic regulator will be less than the maintenance expense of pneumatic apparatus for the same general service. While in respect to the transmission of the control forces to the air-hydraulic regulator, the use of the latter gives characteristic advantages of pneumatic control systems, its use reduces the number of air lines, and particularly of exposed air lines, required, and thereby eliminates or minimizes freezing trouble characteristics of pneumatic control systems.

As a result of the oil reservoir or storage function of the chamber $D^2$, and the associated provisions whereby the pressure chambers $D^3$ and $D^4$ are both normally filled with oil at the beginning of each servo-motor operation, a desirable economy in the amount of compressed air required in each normal operation of the servo-motor is obtained, since when compressed air is supplied to one of the chambers $D^3$ and $D^4$ to effect a corresponding servo-motor operation, all of the air supplied is directly used in displacing oil from that chamber. The locking valve element E gives the apparatus a desirable positiveness of action and prevents any tendency to servo-motor drift or movement as a result of varying pressures in the chambers $D^3$ and $D^4$, other than those existing when the actuating chamber is being supplied with compressed air at a pressure high enough to compress the corresponding spring $E^3$ and displace the piston valve $E^2$. The regulating device F are conveniently accessible for adjustment and provide simple and effective means for regulating the sensitivity or speed of action of the servo-motor.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. An air-hydraulic regulator comprising a combination, a hydraulic servo-motor, a reservoir chamber communicating with the atmosphere, a subjacent pair of pressure chambers, separate liquid connections between said pressure chambers and the servo-motor, and each serving for the transmission of liquid from the corresponding chambers to the servo-motor or for the return of liquid from the latter to the chamber, according to the direction of servo-motor operation, a control valve mechanism adjustable into three different operating conditions, in one of which it supplies compressed air to one of said pressure chambers and permits the exhaust of fluid into said reservoir chamber from the other of said pressure chambers, and in the second of which it supplies compressed air to the last mentioned chamber and permits the exhaust of fluid from the other pressure chamber into said reservoir chamber, and in the third of which it supplies compressed air to neither of said pressure chambers, and means permitting the return of liquid to said pressure chambers from said reservoir chamber in the third condition of said valve mechanism.

2. An air-hydraulic regulator comprising a combination, a hydraulic servo-motor, a reservoir chamber communicating with the atmosphere, a subjacent pair of pressure chambers, separate liquid connections between said pressure chambers and the servo-motor, and each serving for the transmission of liquid from the corresponding chambers to the servo-motor or for the return of liquid from the latter to the chamber, according to the direction of servo-motor operation, a control valve mechanism adjustable into three different operating conditions in one of which it supplies compressed air to one of said pressure chambers and permits the exhaust of fluid into said reservoir chamber from the other of said pressure chambers, and in the second of which it supplies compressed air to the last mentioned chamber and permits the exhaust of fluid from the other pressure chamber into said reservoir chamber and in the third of which it supplies compressed air to neither of said pressure chambers, and connections including non-return valves for the passage of liquid to said pressure chambers from said reservoir chamber.

3. An air-hydraulic regulator comprising a combination, a hydraulic servo-motor, a reservoir chamber communicating with the atmosphere, a subjacent pair of pressure chambers, separate liquid connections between said pressure chambers and the servo-motor, and each serving for the transmission of liquid from the corresponding chambers to the servo-motor or for the return of liquid from the latter to the chamber, according to the direction of servo-motor operation, a control valve mechanism adjustable into three different operating conditions in one of which it supplies compressed air to one of said pressure chambers and permits the exhaust of fluid into said reservoir chamber from the other of said pressure chambers, and in the second of which it supplies compressed air to the last mentioned chamber and permits the exhaust of fluid from the other pressure chamber into said reservoir chamber and in the third of which it supplies compressed air to neither of said pressure chambers, and a separate conduit connection including a non-return valve from said reservoir chamber to each pressure chamber, opening to the latter below the normal liquid level therein, for passage of liquid to said pressure chamber from said reservoir chamber.

ANDREW J. FISHER.